United States Patent

Martin et al.

[11] Patent Number: 5,176,562
[45] Date of Patent: Jan. 5, 1993

[54] DARK MEAT DEBONER WITH LEG SCRAPER

[75] Inventors: Eugene Martin, Denver; Scott Cook, Strasburg, both of Pa.

[73] Assignees: Foodcraft Holdings, Inc., Wilmington, Del.; Gordex Corporation, Isehara, Japan

[21] Appl. No.: 794,186

[22] Filed: Nov. 19, 1991

Related U.S. Application Data

[63] Continuation-in-part of Ser. No. 690,822, Apr. 26, 1991, Pat. No. 5,102,369.

[51] Int. Cl.⁵ ............................................. A22C 21/00
[52] U.S. Cl. .................................... 452/136; 452/127; 452/128; 452/138
[58] Field of Search ............... 452/136, 135, 138, 128, 452/127, 125

[56] References Cited

U.S. PATENT DOCUMENTS

| | | | |
|---|---|---|---|
| 3,057,006 | 10/1962 | Cutera | 452/136 |
| 3,581,337 | 6/1971 | Tonjum et al. | 452/136 |
| 3,672,000 | 6/1972 | Martin et al. | 452/136 |
| 4,041,572 | 8/1977 | Martin et al. | 452/138 |
| 4,216,565 | 8/1980 | Volk et al. | 452/136 |
| 4,327,463 | 5/1982 | Martin | 452/138 |
| 4,495,675 | 1/1985 | Hill et al. | 452/136 |
| 4,639,972 | 2/1987 | Martin et al. | 452/138 |
| 4,644,608 | 2/1987 | Martin et al. | 452/136 |
| 4,669,150 | 6/1987 | Manmoto et al. | 452/136 |
| 4,736,492 | 4/1988 | Hazenbroek et al. | 452/138 |
| 4,811,457 | 3/1989 | Lindert | 452/136 |
| 4,843,682 | 7/1989 | Bowen | 452/136 |
| 4,882,810 | 11/1989 | Ostholt et al. | 452/138 |
| 4,893,378 | 1/1990 | Hazenbroek et al. | 452/138 |
| 4,932,102 | 6/1990 | Hazenbroek et al. | 452/136 |
| 4,993,113 | 2/1991 | Hazenbroek | 452/136 |
| 5,030,163 | 7/1991 | Mielnik | 452/136 |

*Primary Examiner*—Willis Little
*Attorney, Agent, or Firm*—Shoemaker & Mattare

[57] ABSTRACT

An apparatus for deboning a chicken leg includes a conveyor for holding the leg by the hock, a plunge knife device for severing the knee joint and pulling the femur from the thigh meat, a cutting device for severing the tendons at the hock of the leg, and a scraper for pulling the drumstick meat along the tibia and fibia toward the knee. The scraping mechanism includes a laterally movable carriage supporting at least one pair of jaws having notches along their edges to clear the leg bones, a first air cylinder for closing and opening the jaws, and a second air cylinder for moving the carriage away from the hock-restraining conveyor.

14 Claims, 11 Drawing Sheets

DARK MEAT DEBONER WITH LEG SCRAPER

This application is a continuation in part of copending U.S. patent application Ser. No. 690,822, filed Apr. 26, 1991, now U.S. Pat. No. 5,102,369.

BACKGROUND OF THE INVENTION

This invention relates to the art of butchering, and more particularly to an apparatus for automatically removing the bones from whole poultry (especially chicken) legs.

There are numerous prior devices for removing bones from drumsticks, and some for deboning thighs. However, we are unaware of any prior device or method which debones whole legs, without separating the drumstick from the thigh.

Recently developed deboning machines have focused particularly on the breast, and the market has demonstrated high consumer acceptance of deboned breasts. The value of a breast can be significantly enhanced by removing the bones prior to sale. It now appears that a similar market exists, or would exist, for deboned whole chicken legs. The present invention addresses the problem of removing bones from whole legs, which present problems different from, and in some respects more difficult than, breasts.

In our copending application, we described an apparatus for separating the bones from the flesh of a chicken leg, particularly the thigh bone (femur). We have since improved the apparatus by providing a mechanism for scraping the tibia and fibia so as to pull the drumstick meat toward the knee joint, without severing from the thigh meat. That portion of the apparatus is new to this application.

SUMMARY OF THE INVENTION

An object of this invention is to remove entirely the bones from a whole chicken leg, without severing the drumstick from the thigh, and without any substantial removal of flesh. A related object is to produce a boned leg product which is attractive and cleanly cut, and free of tendons and ligaments.

Another object is to automate the tediously repetitive operation of boning legs in a poultry processing plant.

The above objects are met by an apparatus for removing the bones from a poultry leg which has been prepared by making a lengthwise cut along the inside of the leg, along the femur and tibia, and a transverse cut through only the inside of the knee joint. The apparatus includes a conveyor for holding the drumstick portion of the leg by the hock, and conveying it through a series of stations, the first of which includes a plunge knife that severs the knee joint and pulls the femur out of the thigh meat through the lengthwise cut. At the next station the ankle joint tendons are severed above the hock, and the last station has a scraping mechanism for separating the drumstick meat from the bones. The scraping mechanism has a carriage movable toward and away from the conveyor, at least one pair of jaws, supported by the carriage, and movable toward and away from one another. The jaws are closed upon the leg adjacent the hock, and then the carriage is moved away from the conveyor, pulling the drumstick meat along the bones, away from the hock.

Common terminology (such as "hock", "drumstick", and "knee") is used throughout this specification, instead of corresponding proper anatomical terms.

It should be understood that, although we refer to chicken legs throughout this document, the method and apparatus disclosed would be easily adapted to other birds, or even other animals generally, and that the invention claimed is intended to cover all such uses.

DESCRIPTION OF THE PREFERRED EMBODIMENT

Figure 1:
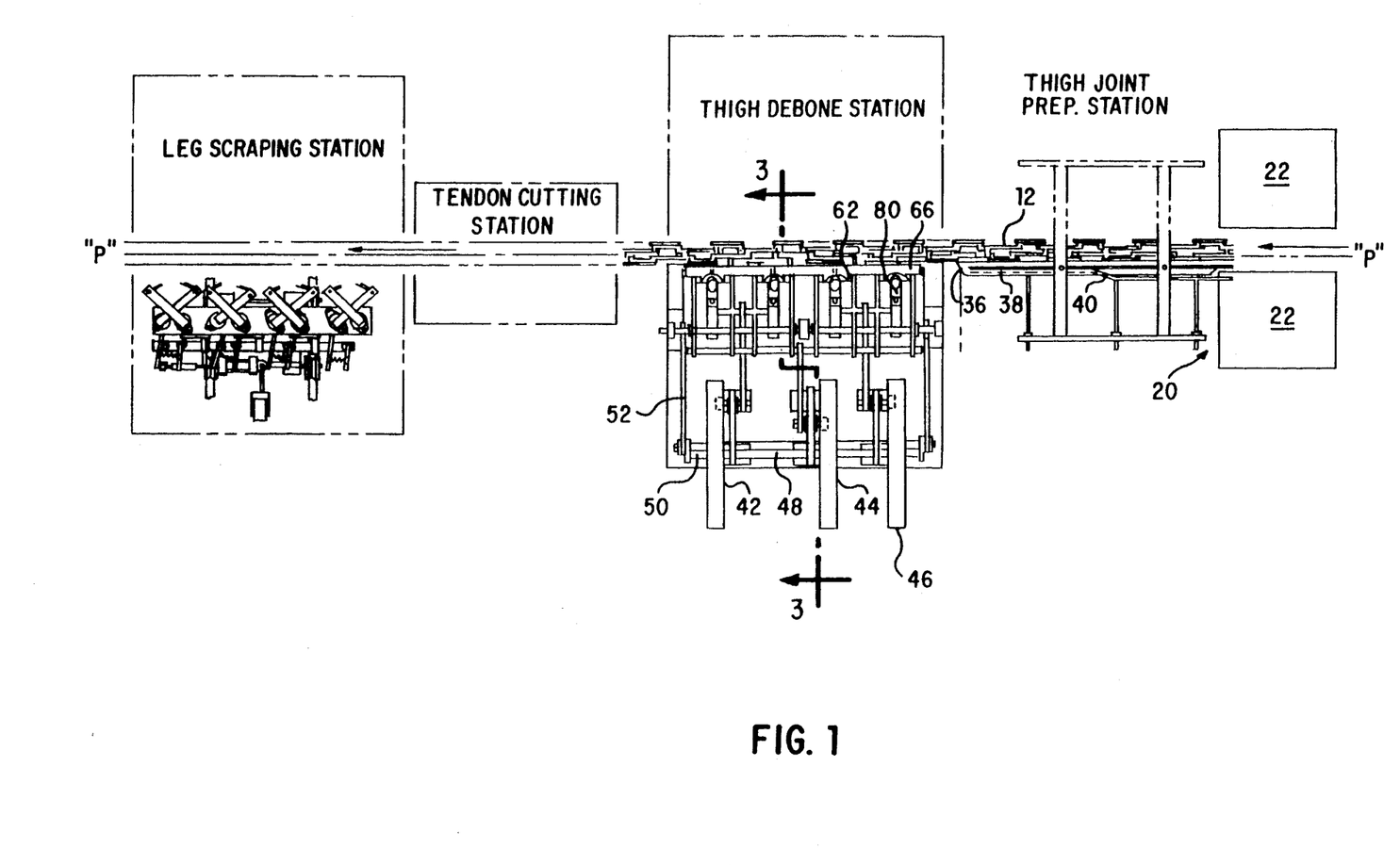
FIG. 1 is a top plan view of an apparatus embodying the invention, looking down parallel to a center plane P.

An apparatus embodying the invention comprises a frame 10, shown generally in FIG. 1, which supports a linear, horizontal chain conveyor 12 passing along a vertical center plane P from an upstream end to a downstream end, as indicated by the arrow. The conveyor is driven intermittently by a conventional mechanism, not shown, including an electric motor and a right-angle gear reduction unit.

At the upstream end of the apparatus, there is a joint preparation station 20, where preliminary cutting steps are presently performed manually. It may be possible to automate the cutting steps, which are described in detail below with the operation of the apparatus.

The joint preparation station comprises horizontal surfaces 22 on either side of the chain conveyor, where workers can orient and partially cut whole chicken legs. The broken lines toward the top of the Figure are intended to indicate that there is corresponding structure on either side of the center plane, and in fact the entire apparatus is substantially symmetrical. To avoid duplication, only structure on one side of the center plane is shown in detail.

Figure 4:
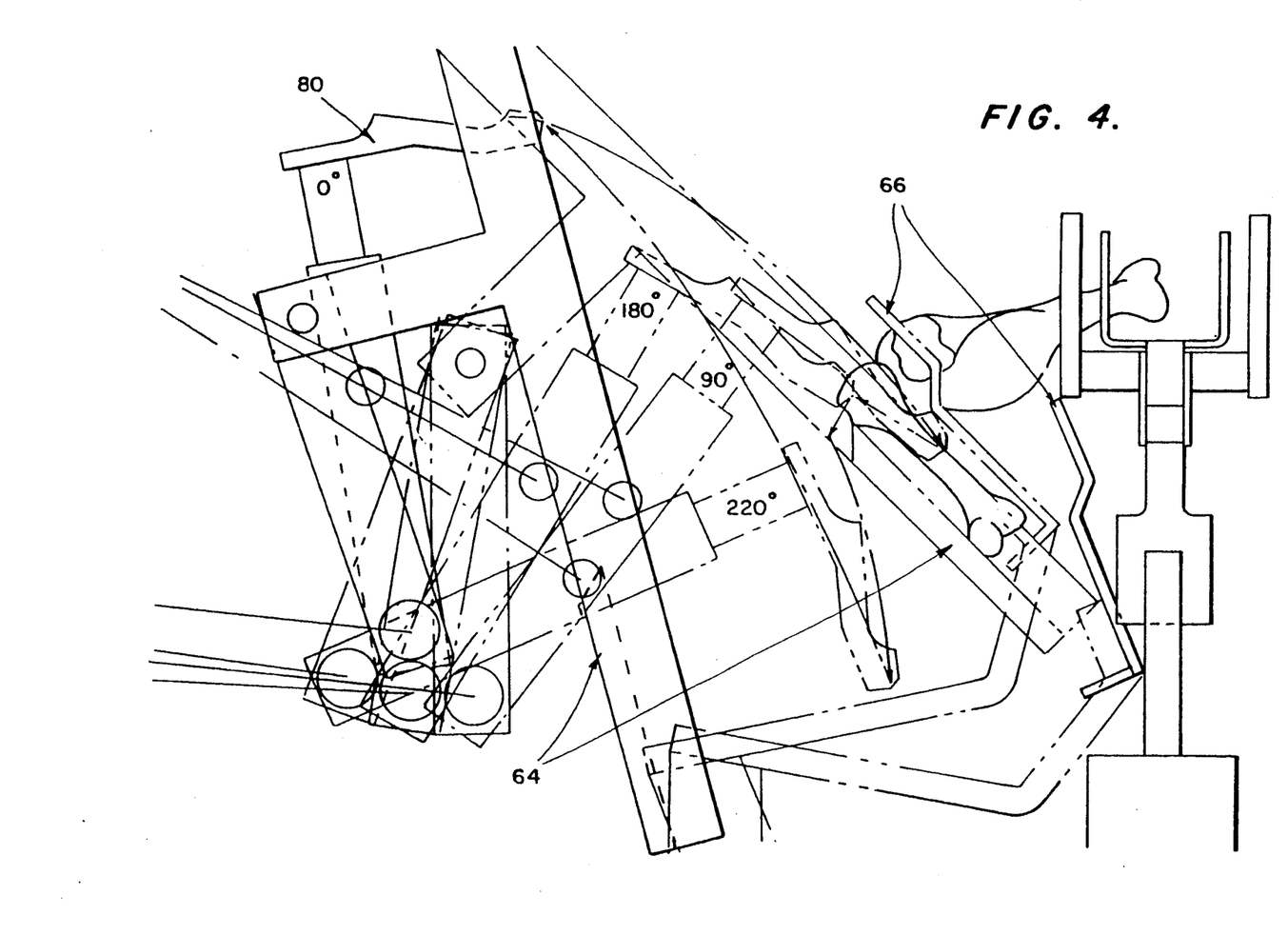
FIG. 4 is an enlarged view of a portion of FIG. 3.
Figure 5:
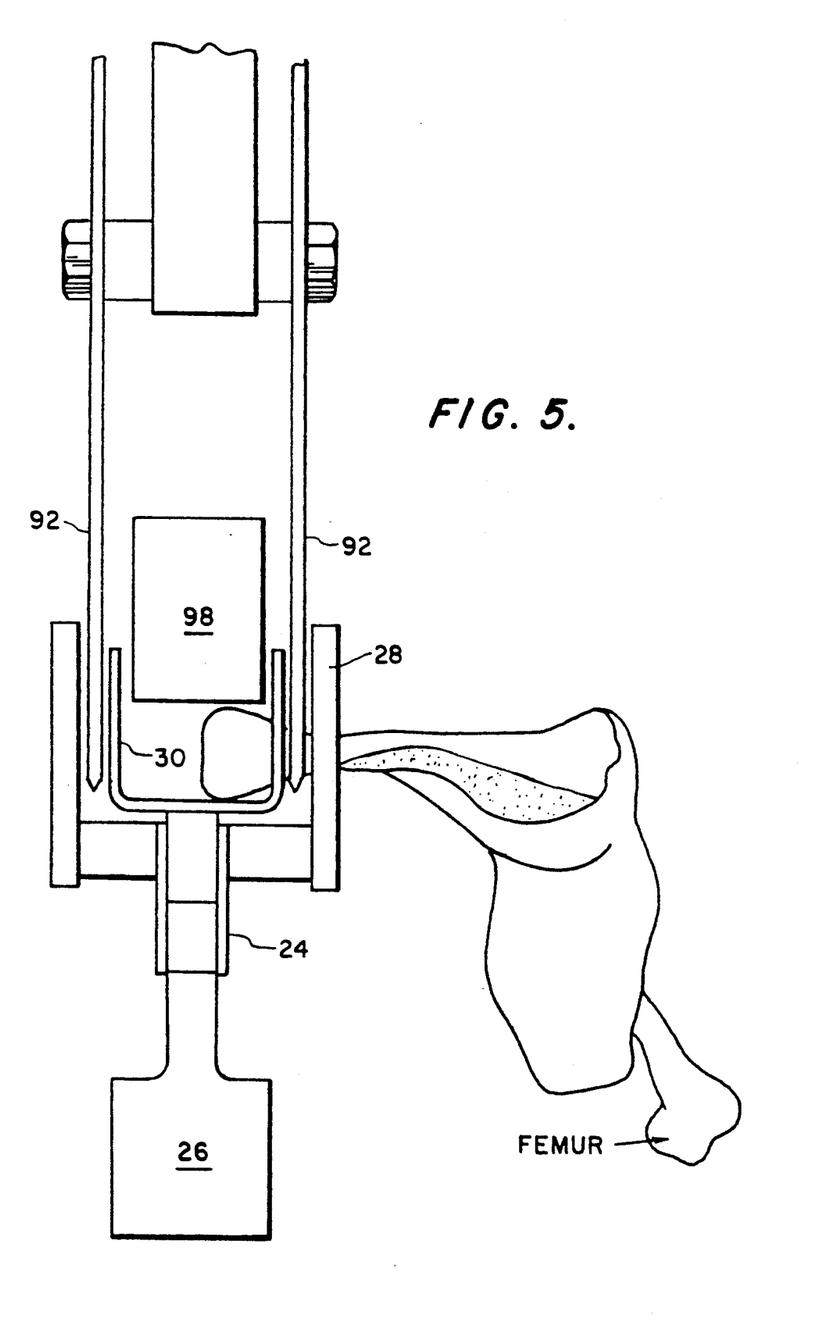
FIG. 5 is a sectional view taken along the plane 5—5 in FIG. 2.

"Whole chicken leg" herein means the thigh and drumstick, connected at the knee joint, without the feet, which have previously been removed, so that the drumstick terminates at the hock, which is the end corresponding to the ankle joint. A leg is illustrated in FIGS. 4 and 5. As best seen in those figures, and in FIG. 2, the conveyor 12 comprises a single No. 60 (¾ inch pitch) chain 24 riding on a UHMW plastic guide 26, and provided, on either side, with pairs of tabs 28,30 at seven-and-a-half inch intervals.

Each tab pair has a space 32 therebetween, and a transverse slot 34 sized to receive the distal end of a drumstick, but too narrow for the hock to pass through.

The slot is cut at a compound angle, so that the center of the slot extends, in a direction away from the center plane, preferably 40° rearward (i.e., in the upstream direction) and 30° downward, to properly orient the drumstick for the deboning operation.

Just downstream of the joint preparation station, the drumstick is engaged from below by a channel member 36 extending parallel to the conveyor direction, just below and outside the bottom of the tab slots, and from above by two stationary rods extending generally in the direction of the conveyor. The inboard of these rods, 38, slightly closer to the center plane than the innermost tabs, keeps the hock within the slots. The outboard rod 40 descends in the downstream direction, and curls partially around the channel iron, so that as the leg progresses downstream, the knee is flexed and the thigh is partially inverted, with the longitudinal cut in the thigh facing down and away from the conveyor.

The femur removing station occupies the center portion of FIG. 1, in which structure on only one side of the center plane is shown. It may be mentioned here that the conveyor chain moves intermittently, stroking thirty inches per cycle. Since the tab spacing is a quarter of this distance, four legs are advanced per stoke, and the four are acted upon simultaneously during the dwell period in the femur removing station.

Figure 3:
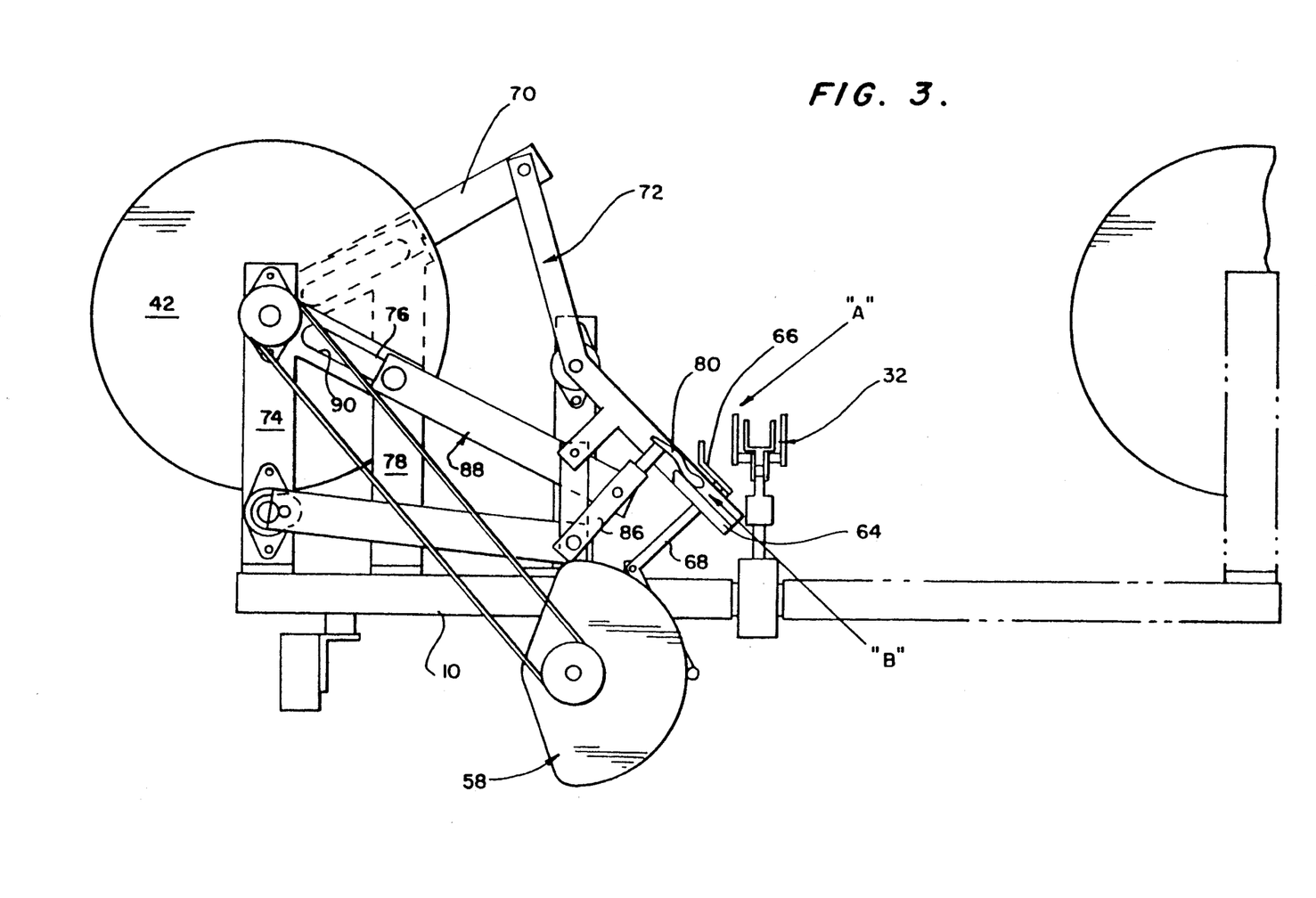
FIG. 3 is a sectional view taken along the transverse plane 3—3 in FIG. 1.

Details of the femur removing station are shown in the top and lateral view of FIGS. 1 and 3, from which unessential detail has been omitted. The mechanism shown comprises three large cams 42,44,46, the outer two of which are identical and drive the plunge knives described below; the middle cam 44 drives a thigh clamp. The cams are mounted on a common shaft 48 which extends parallel to, and is driven through gearing (not shown) by, a crankshaft 50 having a Pittman arm 52 with a small stroke, that controls the position of the pivot point 54 of the knife arm 56. Although the crankshaft movement is continuous, the conveyor movement is synchronized with it, mechanically or electrically, at one cycle per crankshaft revolution, and the cams have dwell events in which the knife is retracted. during movement of the conveyor. The lowermost cam 58 (FIG. 3) operates a thigh clamp 60 which immobilizes the femur and properly positions it for the plunge knife. Structural members 74,76,78 are stationary, being connected to the frame 10.

The thigh clamp 60 includes an anvil 62 comprising a metal support and two stiff but deflectable polyethylene members 64 (or "squeegees") which are connected to the support at their outer edges only. The squeegees meet, or nearly meet, edge-to-edge opposite a dwell position of one of the conveyor tab slots and astride a transverse plane containing the centerline of the plunge knife, defining between them a slit or slot through which the femur can be drawn, but not the entire thigh. The squeegees (see FIG. 8) are stiff enough to provide a substantial supporting force for the thigh, but sufficiently resilient to allow the slot to open slightly as the femur is drawn through.

The thigh is clamped against the squeegee surface from above by a "cradle" 66, which is drawn from an upper rest position toward the squeegees by the link 68 driven by cam 58. The anvil itself is moved by the cam 44 via a follower on link 70, and lever 72, between a lower rest position and an upper working position. Thus, the pocket formed between the squeegees and the cradle is open at rest (while the conveyor is moving), and closed around the thigh during deboning.

Figure 6:
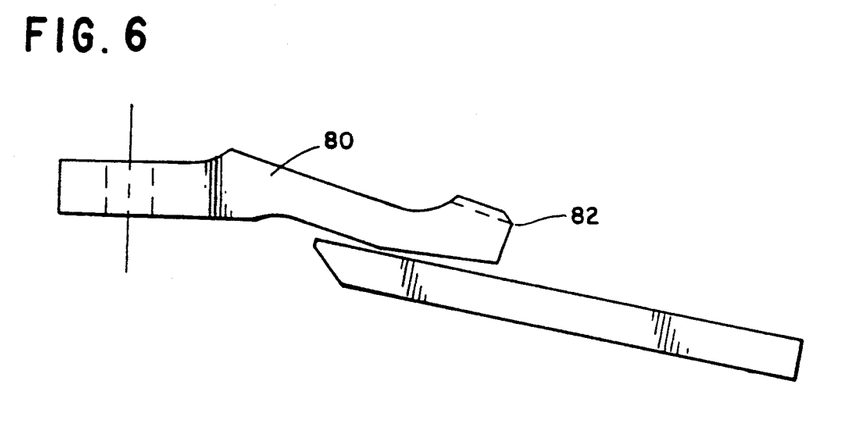
FIG. 6 is a an enlarged side elevation of a plunge knife shown in FIG. 3.
Figure 7:
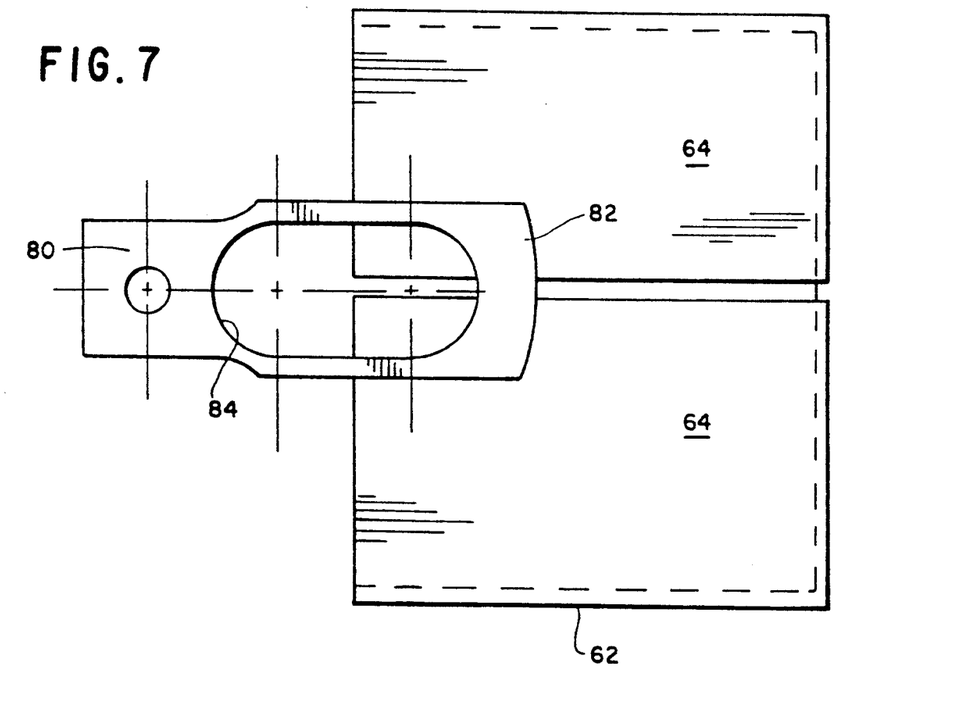
FIG. 7 is a view of the plunge knife, taken in direction "A" in FIG. 3.

FIG. 6 shows the plunge knife 80 in detail, viewed along direction "A" in FIG. 3. The mounting hole by which the knife is connected to its arm is shown at the left side of the drawing; the cutting edge 82 is depicted at the right. The upper surface of the knife, adjacent the cutting edge, defines a cylindrical arc. The upper edge is beveled at 45°, and, as indicated by the broken line, the cutting edge forms a circular arc. The oval opening 84 at the center of FIG. 7 provides clearance for the end of the femur.

The lower end of the knife arm is pivotally connected to the link 86 suspended from the lever 72, and also to the pittman, which varies the location of the pivot point during the cycle. As will be explained, the movement and orientation of the knife is critical to the deboning process. The upper end of the knife arm is oscillated with respect to the pivot point by the link 88, which is driven by cam 42 or 46 via a follower that is constrained to move within a slot 90 in the stationary member 76. It should be noted that the four knives operate in unison, each pair of the knives being driven by a respective one of the cams. Also, the four squeegee supports, and the cradles are ganged together, or are unitary, and operate together.

FIG. 4 shows successive positions of the knife, which are produced by the cooperative effect of the cams 42,44,46,58, and links 52,70,72,86,88. The degree markings denote cam positions, 0° being the middle of the dwell event. The sequence is described below with the operation of the device.

Figure 2:
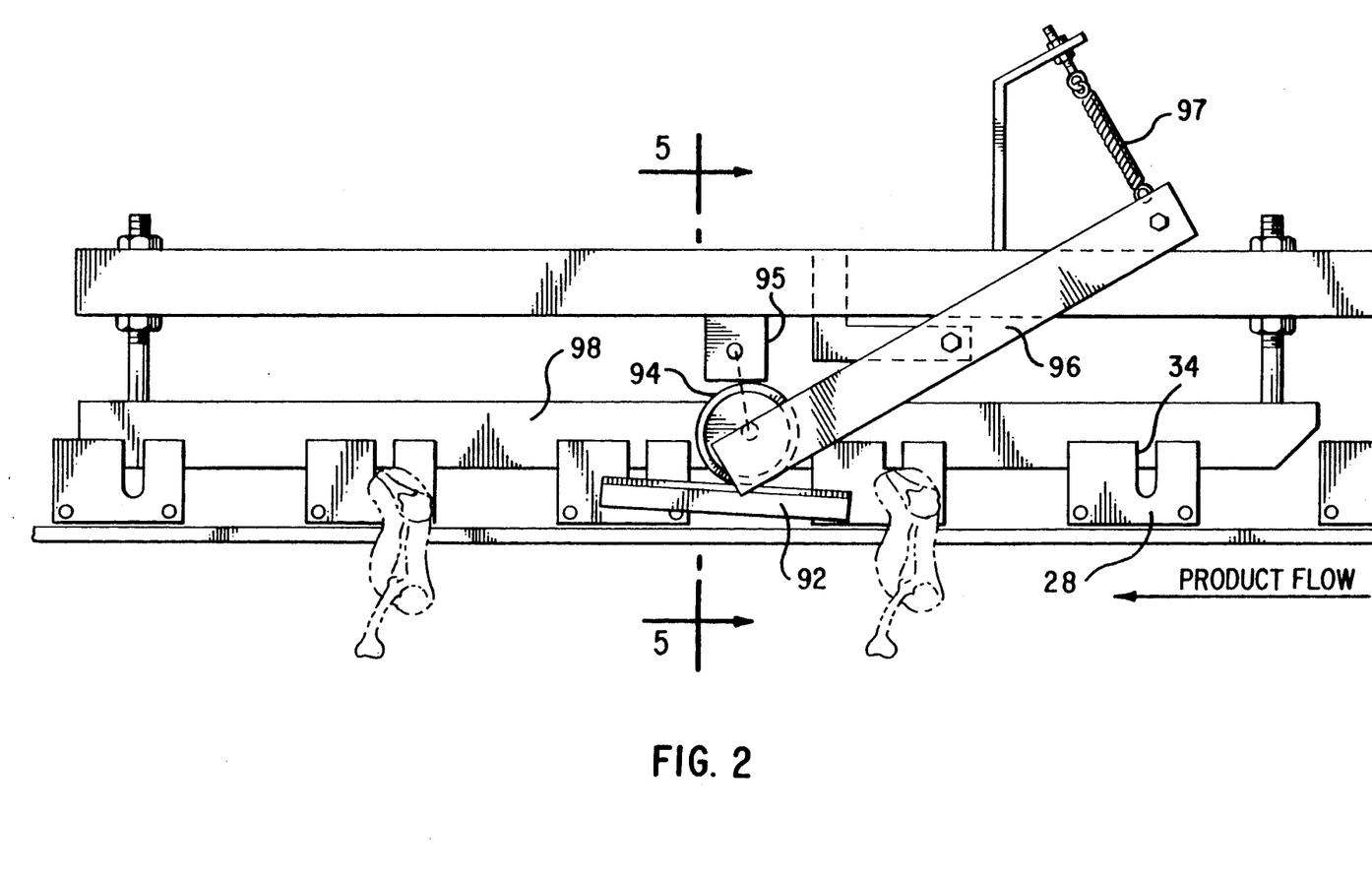
FIG. 2 is a front elevation of a portion thereof.

Downstream of the plunge knives, there is a station at which the tendons at the back of the hock are cut, and the skin at the front of the hock is severed. This station is illustrated in FIG. 2. As shown, there is a stationary knife 92 extending parallel to the conveyor, just outboard of the flights, slightly above the level of the bottom of the hock notches. This knife cuts the skin at the front of the hock. Above the knife, in substantially the same vertical plane, there is a rotary blade 94, driven by a motor 95 so that the direction of motion of the bottom edge of the blade is opposite the direction of movement of the conveyor. The blade is mounted at one end of a lever 96, having a pivot mount to a member extending upwardly from the conveyor frame. If the weight of the blade and motor do not provide the proper amount of downward force, compensating force may be provided by a biasing spring 97. As the legs pass the rotary blade, the tendons are cut as the the blade rides up over the tibia.

Finally, there is a station for scraping or pulling the drumstick meat away from the hock, along the tibia and fibia, toward the knee. This portion of the apparatus is described in detail below.

Figure 8:
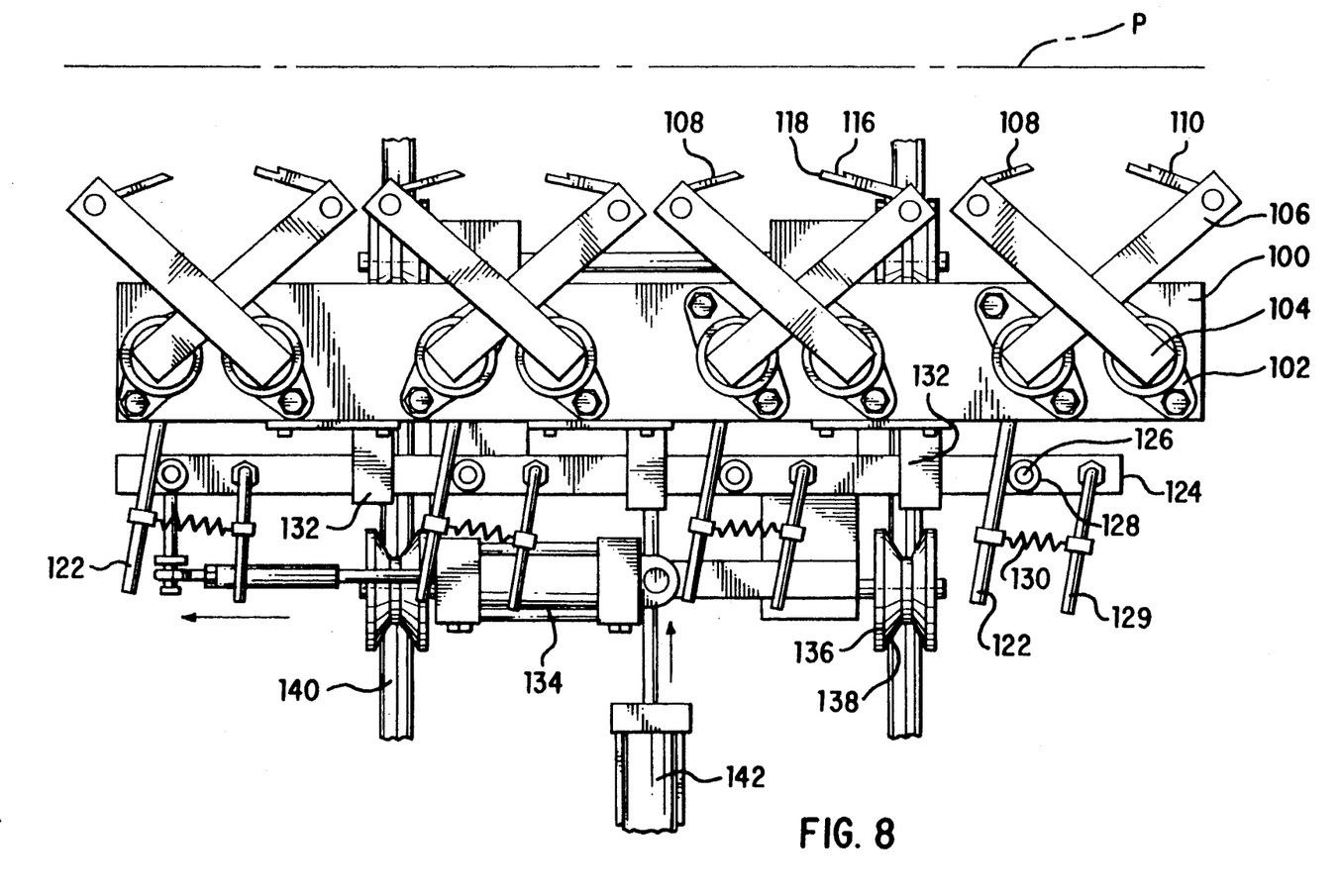
FIG. 8 is a top plan view of a portion of the apparatus shown in FIG. 1, showing a scraping device with its jaws open.

As shown in FIG. 8, the leg scraping device comprises a frame 100 having bearings 102 affixed thereto for supporting four pairs of pivotable vertical shafts 104. A horizontal arm 106 is affixed to the end of each shaft. In each pair, the arms overlap vertically, forming an "X" whose included angle varies as the machine is operated. At the end of each arm, there is a jaw 108 or 110 extending in a vertical plane downward from the distal end of the arm.

Figure 9:
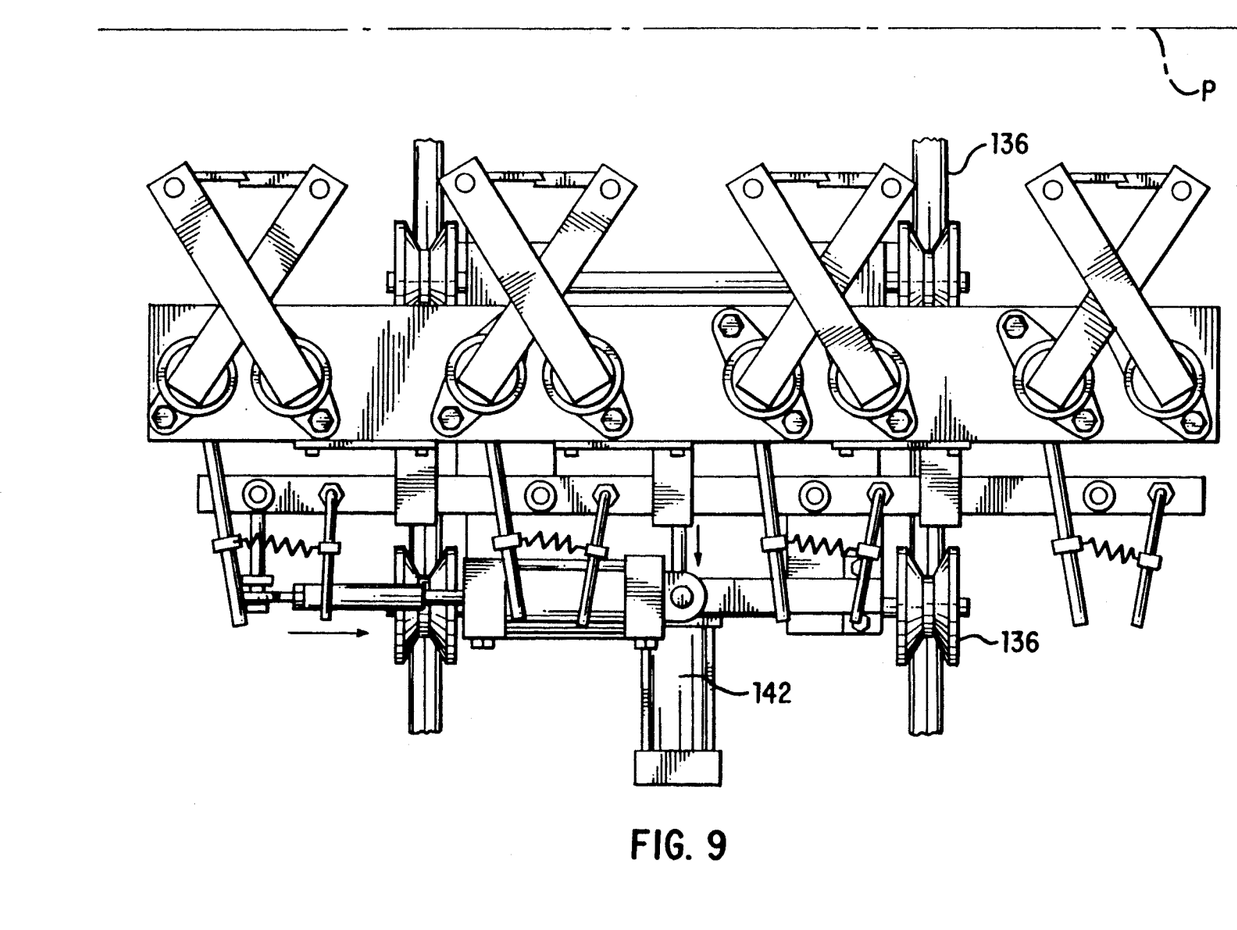
FIG. 9 is a view corresponding to FIG. 8, showing the scraping device with its jaws closed.
Figure 10:
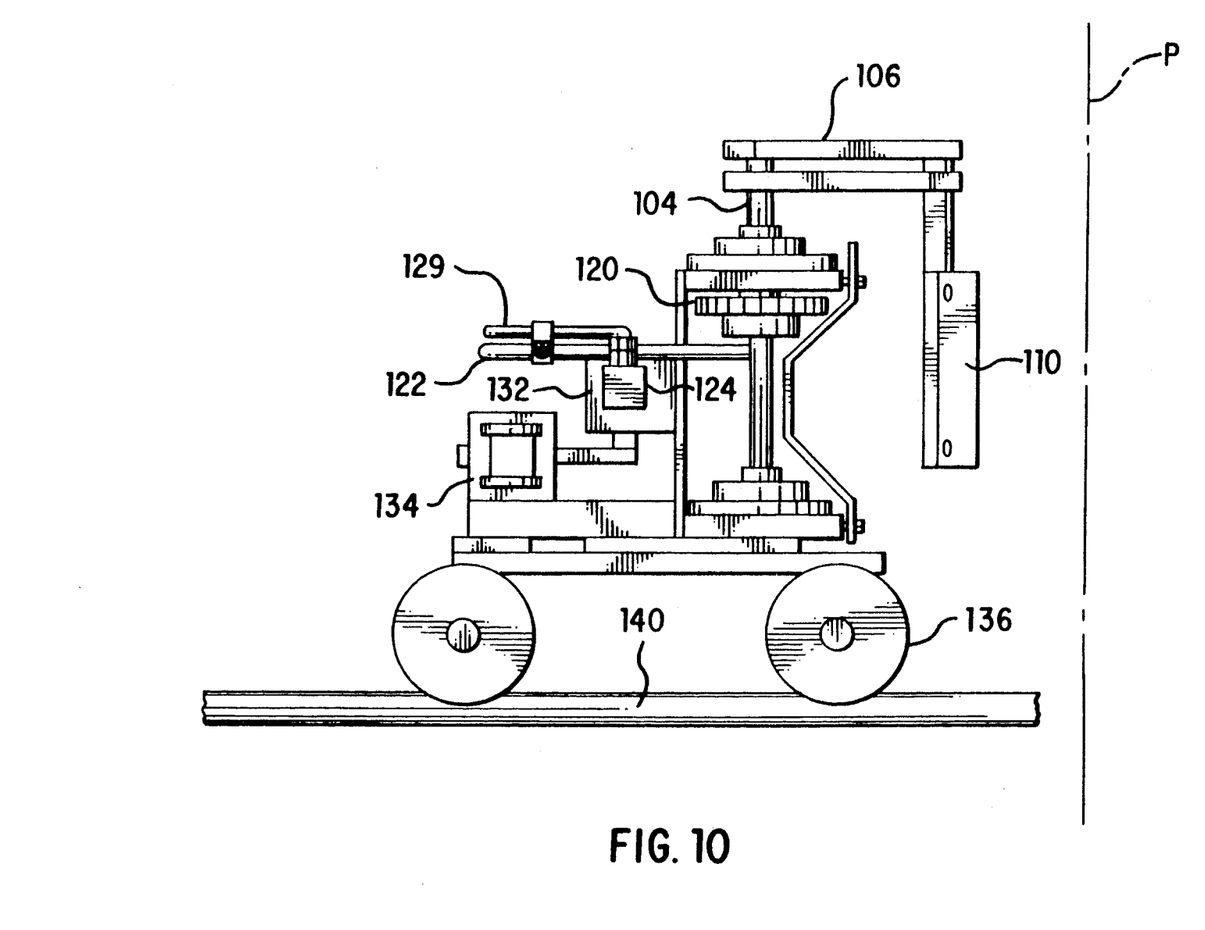
FIG. 10 is an end view of the scraping device.
Figure 11:
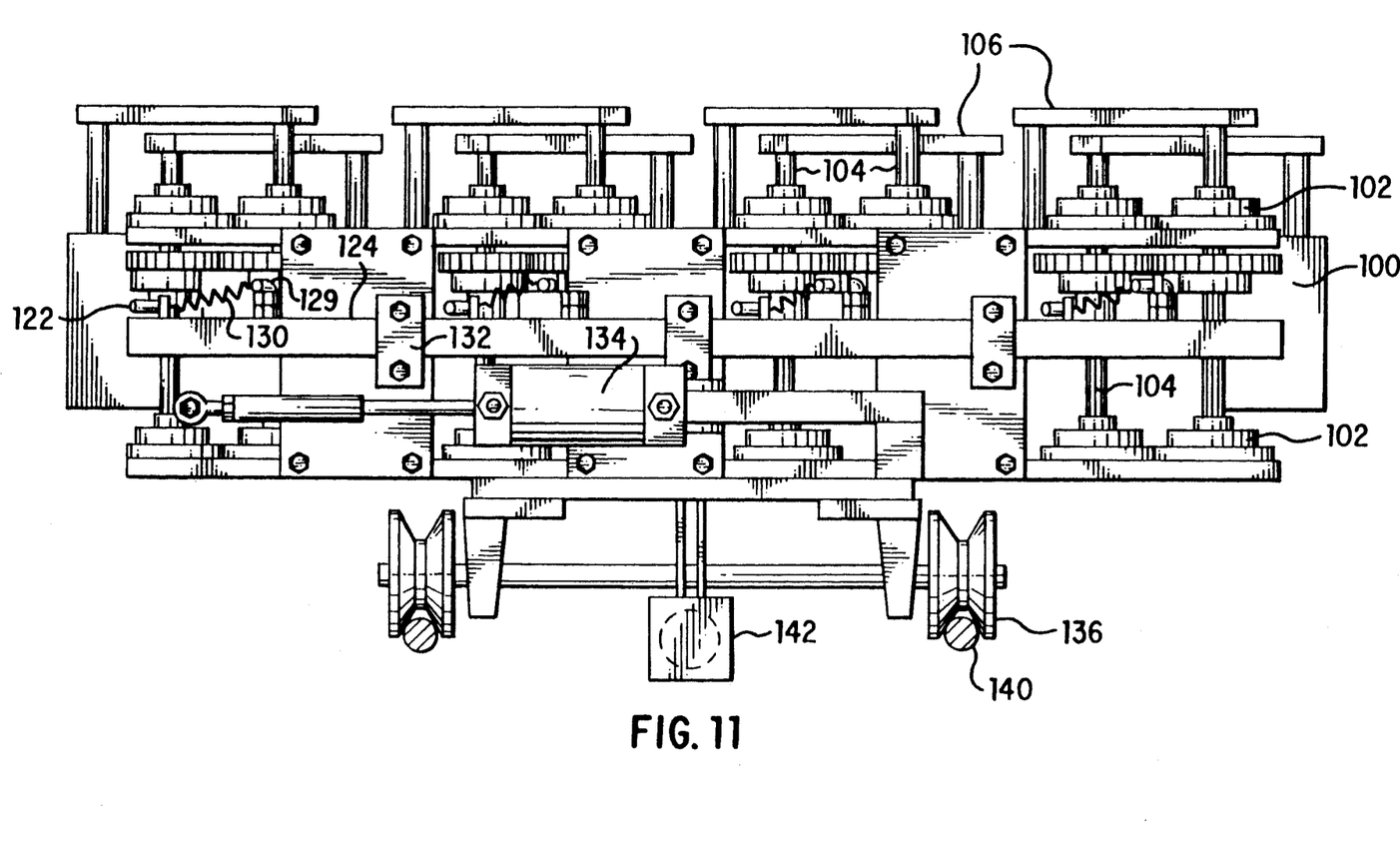
FIG. 11 is a front view of the scraping device, looking toward the center plane of the apparatus.
Figure 12:
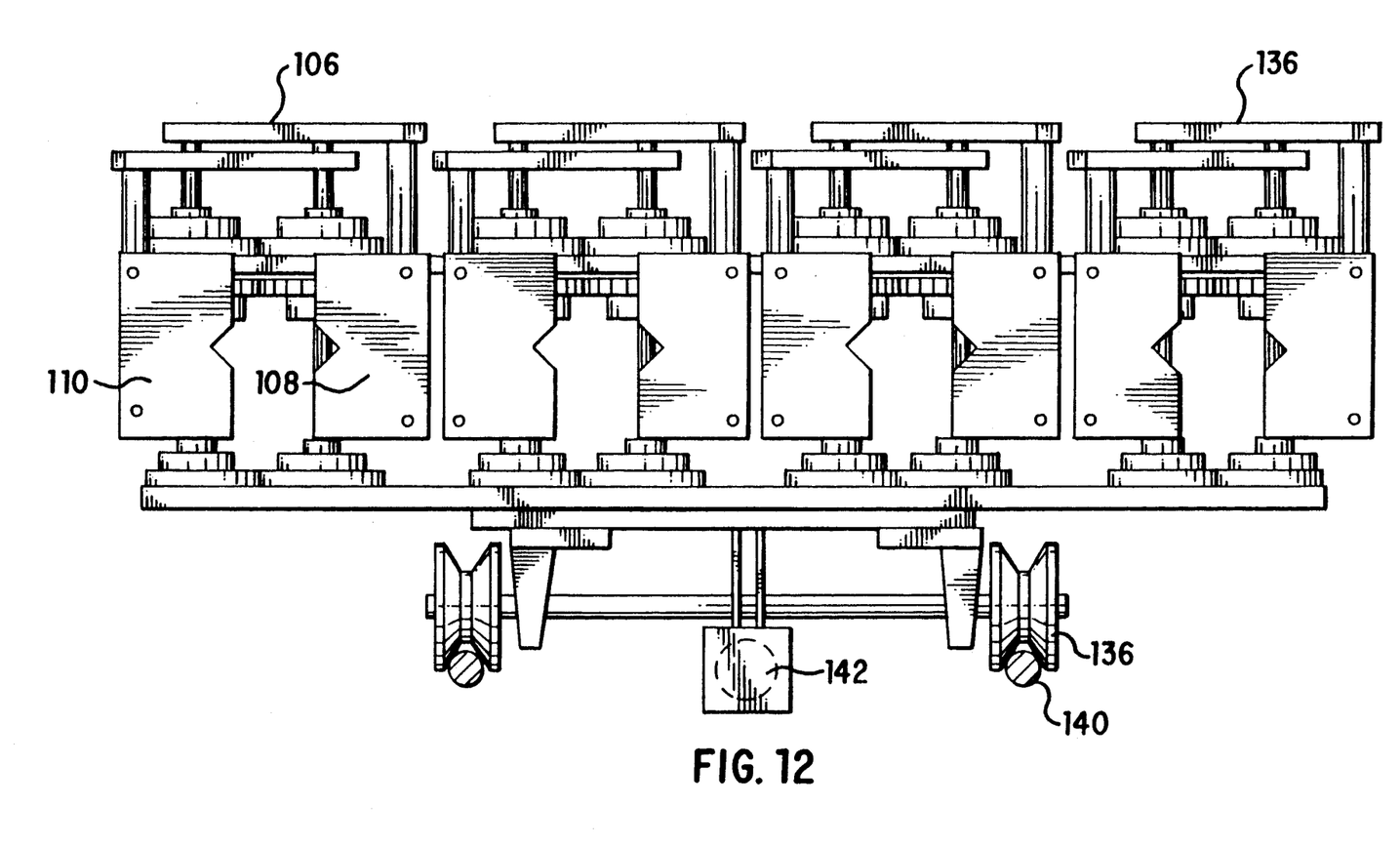
FIG. 12 is a rear view of the scraping device, looking away from the center plane of the apparatus.

The two jaws in each pair are not identical. One (108) is made from a generally rectangular piece of metal plate, having a small cutout 112 at the center of one of its vertical edges, for clearing the tibia. The other plate (110) is substantially thicker, made of an approved plastic such as ultra-high molecular weight polyethylene, and having a larger cutout 114 for the tibia. The plastic plate is relieved at 116 along its vertical working edge 118, to receive the corresponding edge of the opposite metal plate 108, as shown in FIG. 9. Note that the rear surfaces of the plates are approximately coplanar in this configuration. The relief causes the metal plate to support and add strength to the plastic plate during scraping.

Each of the shafts 104 has a spur gear 120 affixed to it, the pitch diameters of these gears being chosen so that the two gears on each pair of shafts mesh. As a result, the movement of the arms is opposite but equal, as can be seen in the drawings, an only one of the shafts need be driven. Accordingly, in each pair, one shaft has a horizontal actuating rod 122 welded thereto, extending away from the center plane P, and over a reciprocable drive bar 124 having four upstanding posts 126, each having a cushioning plastic sleeve 128 thereon for contacting a respective one of the rods 122. The bar 124 also has four brackets 128 welded thereto, extending generally parallel to the rods. A coil tension spring 130 is stretched between each of the brackets and its corresponding rod.

The bar 124, supported by plastic sliding bearings 132 mounted on the frame, is driven in either direction by a two-way pneumatic cylinder 134. When the bar is driven in the downstream direction, its posts 126 contact the rods 122 and open the jaws; driven in the opposite direction, the bar 124 pulls the jaws closed via the springs 130. The absence of a positive connection in this direction avoids damage to the mechanism in case a foreign object or misaligned product is lodged between the jaws.

The frame 100 is supported by four wheels 136 mounted on horizontal axes extending parallel to the center plane P. Each wheel 136 has a deep circumferential "V" groove 138, and rides on a rail 140 extending laterally of the center plane P and connected to the main frame of the apparatus. The carriage can move toward and away from the center plane P between extreme positions defined by stops, not shown. To effect such movement, there is a second two-way pneumatic cylinder 142, extending transversely of the center plane, having one end affixed to the frame, and the other to the main frame of the apparatus. The innermost position of the frame is chosen so that, when the jaws close, they engage the leg just above the hock joint of the leg. The stroke of the carriage is about equal to the length of the tibia, so that the jaws can scrape the bone's full length.

While only one scraper device has been described above, it can be seen in FIG. 1 that there are actually two, one on either side of the center plane. They are essentially mirror images of one another; each is designed to work on a right or left leg, respectively.

In operation, workers at the upstream end of the apparatus receive quantities of whole legs at the joint preparation station. Each leg is delivered to the appropriate side of the apparatus; the legs cannot be loaded indiscriminately. Actually, looking in the downstream direction from the preparation station, the right legs of the bird are processed by the left side of the machine, and vice-versa. Each leg is placed on the work surface of the preparation station with the hock toward the center plane and the inside of the leg up, that is, with the knee upstream. Now, an incision or cut is made through the flesh on the inside of the leg, from the hock to the hip, along the downstream side of the tibia and femur. the leg is cut not through, but just deep enough to pass along the bone. Next, a lateral cut is made into the knee joint on the exposed (inner) side of the leg. We presently prefer to make these cuts manually.

The leg, now ready for automatic processing, is next loaded into the next available conveyor tab slot. When the conveyor is cycled, the leg is passed to one of the four identical sites at the deboning station, after the knee has been flexed by the bar 40. During the dwell period of the conveyor, with the hock still firmly within the tab slots, the following events occur in rapid succession: First, the squeegee support is moved upward and toward the conveyor by the cam 44, further opening the knee joint, which is still held together by the ligaments at the outside of the knee. Nearly simultaneously, the cradle is driven toward the squeegee, compressing the thigh so as to immobilize the femur. The plunge knife now moves downward, substantially along both the axis of the femur and that of the knife, roughly direction "A" in FIG. 3, so that the cutting edge of the knife passes between the femur and the tibia, severing the remaining uncut ligaments, and also separating the end of the femur from the surrounding thigh meat.

The knife now undergoes a particularly critical motion, illustrated in FIG. 4. It is withdrawn somewhat in the direction it entered, but only partially—to a point at which the cutting edge is still adjacent the femur. Next, owing to the lateral shifting of the location of the pivot point of the knife arm, in conjunction with the movement of the knife driving link, the knife moves substantially perpendicular to the femur axis, that is, in direction "B" (FIG. 3), and thereafter a substantial distance approximately vertically downward, as shown. Since the femur has been freed already at its knee end, and because the lengthwise cut previously made is now on the bottom of the thigh, the femur can pass out of the thigh meat, through the slot between the squeegees, which prevent the thigh meat from following.

As it happens, the femur usually remains loosely connected to the thigh by some flesh near the hip, but it can be easily removed later by hand or otherwise to form the finished boneless whole leg.

The conveyor next carries the leg through the drumstick skin and tendon severing station in FIG. 2. As the leg moves, the skin at the front of the hock is cut by the stationary knife, and the skin and tendons at the back of the hock are cut by the rotary blade.

Finally, the legs enter the drumstick scraping station, where the meat is pushed up the leg toward the knee. The scraper operates intermittently, being in the inactive position (FIG. 8) while the conveyor chain, which moves intermittently, is in motion. During the time that the chain is stationary, the scraper has an operating cycle comprising four events: first, the carriage is advanced toward the center plane; then, the jaws are closed; then, the carriage is retracted, pulling the leg meat away from the hock; and last, the jaws are opened. This series of movements is generated automatically by a control unit (not shown) having valves for directing compressed air from a source to respective ports on the two cylinders, and limit switches (not shown) on the moving parts of the device by which the control unit can determine the position of the device.

Because the invention is subject to modifications and variations, it is intended that the foregoing description and the accompanying drawings shall be interpreted as illustrative of only one form of the invention, whose scope is to be measured by the following claims.

We claim:

1. An apparatus for removing the bones from a poultry leg which has been prepared by making a lengthwise cut along the inside of the leg, along the femur and tibia, and a transverse cut through only the inside of the knee joint, comprising
   means for holding the drumstick portion of the leg by the hock,
   means for severing the knee joint, and pulling the femur out of the thigh meat through the lengthwise cut,
   means for severing the hock joint tendons above the hock, and
   a scraping mechanism for separating the meat from the bones of a chicken leg drumstick, said scraping mechanism comprising
   a carriage movable toward and away from the hock holding means,
   at least one pair of jaws, supported by said carriage, and movable toward and away from one another,
   means for opening and closing said jaws upon said leg adjacent the hock, and
   means for moving the carriage away from the holding means, to pull the drumstick meat along the bones, away from the hock.

2. A scraping mechanism for separating the meat from the bones of a chicken leg drumstick, comprising
   a conveyor movable longitudinally in a first direction and having means for holding the hock joint of the leg,
   a carriage movable laterally along a second direction substantially perpendicular to said first direction toward and away from the holding means,
   at least one pair of jaws, supported by said carriage, and movable toward and away from one another,
   means for opening and closing said jaws upon said leg adjacent the hock, and
   mans for moving the carriage away from the holding means, to pull the drumstick meat along said bones, away from the hock.

3. The invention of claim 2, wherein said carriage comprises
   a frame,
   a pair of shafts supported by bearings on said frame, each of said shafts being perpendicular to said second direction,
   a pair of arms, each extending radially from said shaft toward said holding means, and supporting a respective one of said jaws at its free end, and
   means for pivoting at least one of said shafts so as to close said jaws.

4. The invention of claim 3, wherein said pivoting means comprises a linear motor, and means linking said motor to said shafts.

5. The invention of claim 4, wherein said linear motor is a double-acting pneumatic cylinder.

6. The invention of claim 5, wherein said linking means comprises a rod extending radially from at least one of said shafts, a bar driven lengthwise by said motor, a lost-motion connection between the bar and the rod including a positive connection for driving said rod in a direction opening said jaws, and a resilient connection between the bar and the rod in a direction closing said jaws, to protect the mechanism in case a foreign object lodges between the jaws.

7. The invention of claim 6, wherein the positive connection is a pin extending from said bar so as to contact said rod, and said resilient connection is a tension spring extending between said bar and said rod.

8. The invention of claim 3, further comprising a pair of meshed gears, each mounted on a respective one of said shafts, to cause the shafts to move together, in opposite directions, when either of the shafts is pivoted.

9. The invention of claim 8, wherein said arms move in parallel planes, and cross one another between the shafts and the jaws.

10. The invention of claim 2, wherein each of said jaws is a plate substantially perpendicular to the length of the drumstick, each plate has a working edge for engaging the leg, and the working edge has a notch for receiving the leg bone.

11. The invention of claim 10, wherein one of said plates is metal and one is plastic, the notch in the metal plate being smaller than that in the plastic plate.

12. The invention of claim 10, wherein one of said plates is metal and one is plastic, the working edge of the plastic plate having a relief for receiving the working edge of the metal plate.

13. The invention of claim 10, wherein said plates are substantially coplanar when closed together.

14. The invention of claim 2, wherein the conveyor has intermittent unidirectional motion, and the apparatus further comprises an automatic control for (a) advancing the carriage toward the conveyor during a dwell period thereof, then (b) closing the jaws on the drumstick, and then (c) retracting the carriage to pull the drumstick meat along the tibia, away from the hock.

* * * * *